United States Patent
Haugeberg

(10) Patent No.: US 10,829,202 B2
(45) Date of Patent: Nov. 10, 2020

(54) ADJUSTABLE ARMREST SYSTEM

(71) Applicant: Textron Innovations Inc., Providence, RI (US)

(72) Inventor: Chad Richard Haugeberg, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 216 days.

(21) Appl. No.: 15/695,738

(22) Filed: Sep. 5, 2017

(65) Prior Publication Data

US 2019/0071184 A1 Mar. 7, 2019

(51) Int. Cl.
*B64C 13/04* (2006.01)
*G05G 1/62* (2008.04)

(52) U.S. Cl.
CPC ........... *B64C 13/0421* (2018.01); *G05G 1/62* (2013.01)

(58) Field of Classification Search
CPC .... G05G 1/62; B64C 13/042; B64C 13/0421; B64C 13/06; B60N 2/767; B64D 11/0644; A47C 7/54; A47C 7/541; A47C 7/543
See application file for complete search history.

(56) References Cited

U.S. PATENT DOCUMENTS

| | | | | |
|---|---|---|---|---|
| 1,706,634 A * | 3/1929 | Seils | ........................ | G05G 1/62 297/411.22 |
| 2,902,085 A * | 9/1959 | Bahnson, Sr. | ......... | B60N 2/757 297/115 |
| 4,012,014 A * | 3/1977 | Marshall | ............. | B64C 13/0421 244/234 |
| 4,069,720 A * | 1/1978 | Thor | ........................ | G05G 9/04 74/471 R |
| 4,913,000 A * | 4/1990 | Wyllie | ..................... | G05G 1/52 74/523 |
| 4,914,976 A * | 4/1990 | Wyllie | ..................... | B25J 13/02 74/523 |
| 5,429,414 A * | 7/1995 | Olsson | ................. | B60N 2/3084 297/14 |
| 5,566,778 A * | 10/1996 | Valier | .................... | B60K 20/02 180/334 |
| 5,884,975 A * | 3/1999 | Su | ............................ | A47C 1/03 297/411.35 |
| 5,897,444 A * | 4/1999 | Hellyer | .............. | A63B 69/0075 473/417 |
| 6,739,669 B2 * | 5/2004 | Etzioni | .................. | A47C 7/543 297/378.1 |
| 6,824,218 B1 * | 11/2004 | van Hekken | ............ | A47C 1/03 297/411.36 |
| 7,395,894 B2 * | 7/2008 | Jang | ...................... | E02F 9/2004 180/271 |
| 7,726,745 B2 * | 6/2010 | Bruns | ...................... | A47C 7/54 297/411.36 |

(Continued)

Primary Examiner — Joseph W Sanderson
(74) Attorney, Agent, or Firm — Slater Matsil, LLP

(57) ABSTRACT

A vehicle control structure including a control podium, a control stick mounted on the control podium and having a range of motion, a mounting sleeve affixed to the control podium, and an armrest having a platform structure and an armrest support, wherein a first portion of the armrest support is disposed in the mounting sleeve. The platform structure is adjustably attached to the armrest support a first angle of a plurality of angles relative to the armrest support, and a first angle of the plurality of angles corresponds to the range of motion.

14 Claims, 9 Drawing Sheets

(56) References Cited

U.S. PATENT DOCUMENTS

| | | | | |
|---|---|---|---|---|
| 7,896,440 B2* | 3/2011 | Tsai | ............. | A47C 1/03 |
| | | | | 297/353 |
| 8,047,612 B2* | 11/2011 | Titz | ............. | B60N 2/753 |
| | | | | 297/411.35 |
| 9,056,675 B2* | 6/2015 | Yates | ............. | B64C 27/56 |
| 9,067,672 B2* | 6/2015 | Yates | ............. | B64C 13/0421 |
| 9,335,783 B2* | 5/2016 | Van Olst | ............. | A61G 5/04 |
| 2003/0045406 A1* | 3/2003 | Stone | ............. | A63B 21/154 |
| | | | | 482/100 |
| 2003/0218373 A1* | 11/2003 | Etzioni | ............. | A47C 7/543 |
| | | | | 297/411.3 |
| 2006/0232116 A1* | 10/2006 | Jang | ............. | E02F 9/2004 |
| | | | | 297/354.1 |
| 2007/0096531 A1* | 5/2007 | Bruns | ............. | B60N 2/767 |
| | | | | 297/411.36 |
| 2010/0194168 A1* | 8/2010 | Titz | ............. | B60N 2/753 |
| | | | | 297/411.38 |
| 2012/0234985 A1* | 9/2012 | Biest | ............. | B64C 13/0421 |
| | | | | 244/234 |
| 2013/0206898 A1* | 8/2013 | Yates | ............. | B64C 13/0421 |
| | | | | 244/17.11 |
| 2013/0206900 A1* | 8/2013 | Yates | ............. | B64C 27/56 |
| | | | | 244/17.25 |
| 2013/0209256 A1* | 8/2013 | Yates | ............. | F01D 7/00 |
| | | | | 416/112 |
| 2013/0211631 A1* | 8/2013 | Yates | ............. | B64C 13/0421 |
| | | | | 701/3 |
| 2015/0128751 A1* | 5/2015 | Van Olst | ............. | A61G 5/04 |
| | | | | 74/491 |

\* cited by examiner

ADJUSTABLE ARMREST SYSTEM

TECHNICAL FIELD

The present invention relates generally to a system for an adjustable armrest, and, in particular embodiments, to a system providing an adjustable armrest for a rotorcraft, the armrest having elements permitting the armrest to be angled to align with different ranges of motion for cyclic and collective controls.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. Generally, in aircraft, including rotorcraft, a pilot controls the flight of the craft using both hands, controlling multiple control sticks or levers with different hands. However, different control stick may have different actions or movement profiles since they control different functions.

SUMMARY

An embodiment vehicle control structure includes a control podium, a control stick mounted on the control podium and having a range of motion, a mounting sleeve affixed to the control podium, and an armrest having a platform structure and an armrest support, wherein a first portion of the armrest support is disposed in the mounting sleeve. The platform structure is adjustably attached to the armrest support a first angle of a plurality of angles relative to the armrest support, and a first angle of the plurality of angles corresponds to the range of motion.

An embodiment armrest includes an armrest support having one or more fingers, with each of the one or more fingers has a pivot hole and a plurality of adjustment holes, a platform structure having a contact surface and one or more attachment structures disposed on an opposite side of the platform structure from the contact surface, where each of the one or more attachment structures has a first attachment hole, and one or more fasteners disposed in the first attachment hole of a first attachment structure of the one or more attachment structures and extending through a first adjustment hole of the plurality of adjustment holes in a first finger of the one or more fingers with the contact surface held in a raised position. A second adjustment hole of the plurality of adjustment holes in the first finger is disposed below the first adjustment hole.

An embodiment rotorcraft includes a first control podium having a first control stick with a first range of motion, a second control podium having a second control stick with a second range of motion that is different from the first range of motion, and a plurality of armrests, each of the plurality of armrests having an armrest support with a post and a platform structure with a contact surface. A first armrest of the plurality of armrests is installed in the first control podium and a first platform structure of the first armrest is attached to a first armrest support of the first armrest with a first contact surface of the first armrest corresponding to the first range of motion. A second armrest of the plurality of armrests is installed in the second control podium and a second platform structure of the second armrest is attached to a second armrest support of the second armrest with a second contact surface of the second armrest corresponding to the second range of motion.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, rotorcraft include increasingly large and more numerous systems for redundancy and new functionality. In particular, the use of fly-by-wire (FBW) systems permits greater flexibility in control arrangements since the controls are not mechanically connected to the flight systems.

Embodiments of the system provided herein are directed to providing an armrest with an adjustable contact surface. The armrest may be adjusted to provide a solid and comfortable platform for a pilot to rest their arm while manipulating the controls of an aircraft. More specifically, the armrests may be arranged to attach to control pedestals in a rotorcraft, and the angle of the armrest contact surface may be adjusted to align the range of motion of a collective control or a cyclic control. Thus, a single model of armrest may be produced and used for different control types, reducing the need to design and produce multiple parts.

Figure 1:
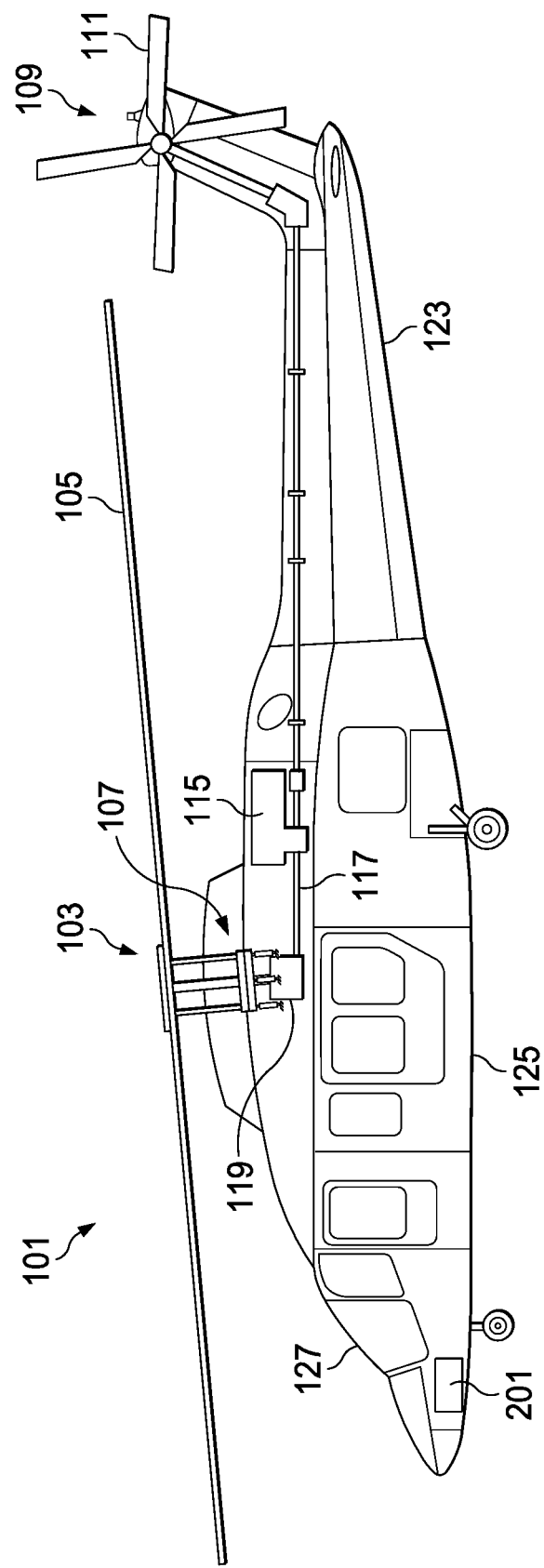
FIG. 1 illustrates a rotorcraft according to some embodiments.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate (not shown) in order to selectively control the attitude, altitude and movement of the rotorcraft 101. The swashplate may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators (not shown). In some embodiments, the FBW system sends electrical signals to the tail rotor actuators or main rotor actuators to control flight of the rotorcraft 101.

The rotorcraft 101 further includes a fuselage 125 and tail section 123. The fuselage 125 includes a passenger compartment 113 or cargo area, and a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or backup pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
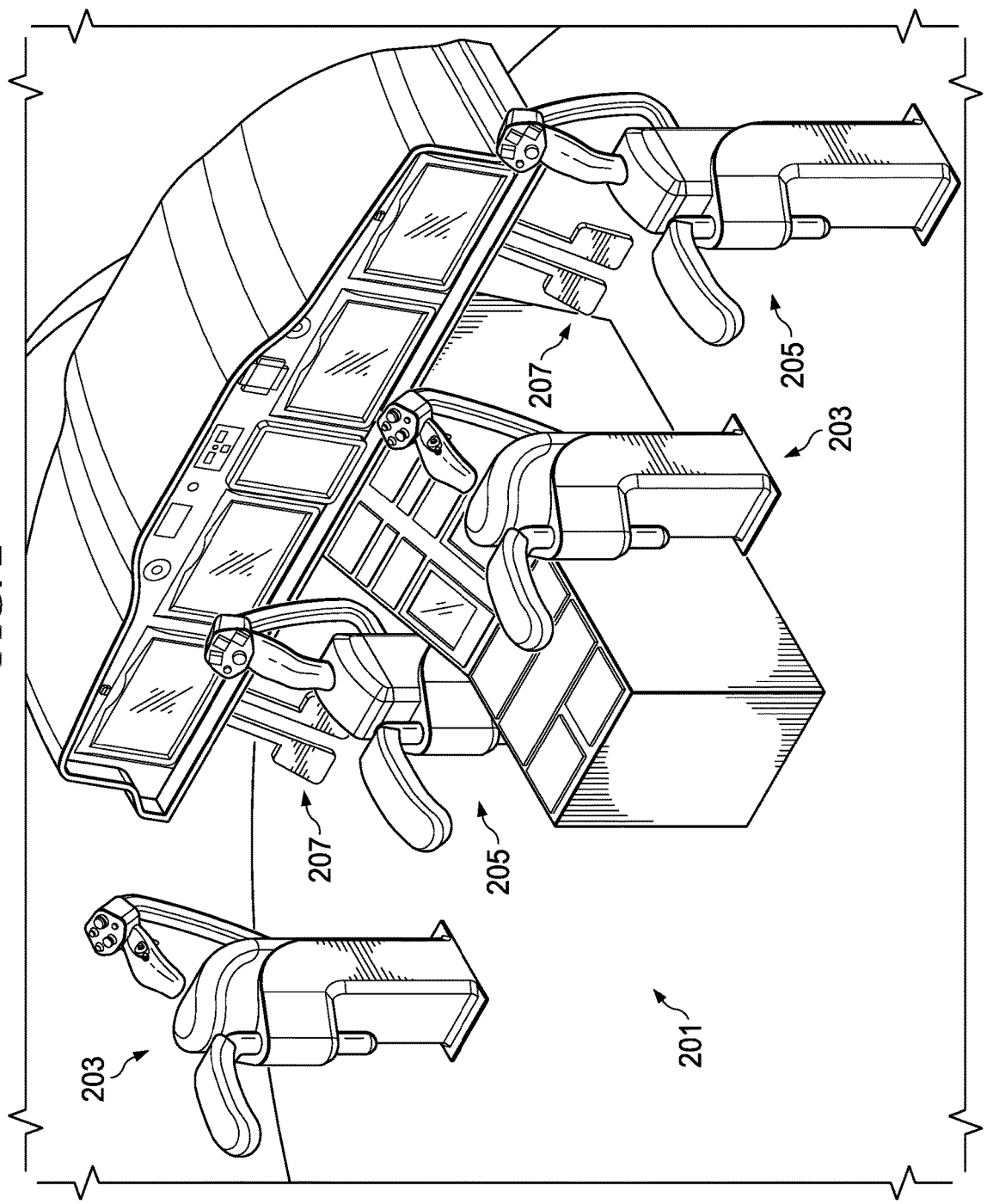
FIG. 2 is a diagram illustrating a cockpit control arrangement according to some embodiments.

FIG. 2 is a diagram illustrating a cockpit control arrangement 201 according to some embodiments. In some embodiments, a rotorcraft has three sets of pilot flight controls in three flight control assemblies that include cyclic control assemblies 205, collective control assemblies 203, and pedal control assemblies 207. A set of each pilot flight control is provided for each pilot (which may include a pilot-in-command and a co-pilot or backup pilot).

In general, cyclic pilot flight controls may allow a pilot to provide cyclic inputs through the cyclic control assembly 205 to set or adjust a cyclic configuration of the main rotor blades, which changes the angle of the individual main rotor blades as the main rotor rotates. This creates variable amounts of lift at varied points in the rotation cycle, causing the rotorcraft to pitch or roll. Collective pilot flight controls may allow a pilot to provide collective inputs through the collective control assembly 203 to set or adjust a collective configuration of the main rotor blades so that the angle of attack for all main rotor blades may be collectively altered by equal amounts and at the same time, resulting in ascent, descent, acceleration, and deceleration. Anti-torque pilot flight controls may allow a pilot to change the amount of anti-torque force applied to the rotorcraft. Tail rotor blades may operate to counter torque created by driving the main rotor. Anti-torque pilot flight controls may allow a pilot to provide pedal inputs through the pedal control assembly 207 and change the amount of anti-torque force applied to change a heading of the rotorcraft. For example, providing anti-torque force greater than the torque created by driving the main rotor may cause the rotorcraft to rotate in a first direction. Similarly, providing anti-torque force less than the torque created by driving the main rotor may cause the rotorcraft to rotate in a second direction opposite the first direction. In some embodiments, anti-torque pilot flight controls may change the amount of anti-torque force applied by changing the pitch of the tail rotor blades, and increasing or reducing thrust produced by tail rotor blades.

Figure 3:
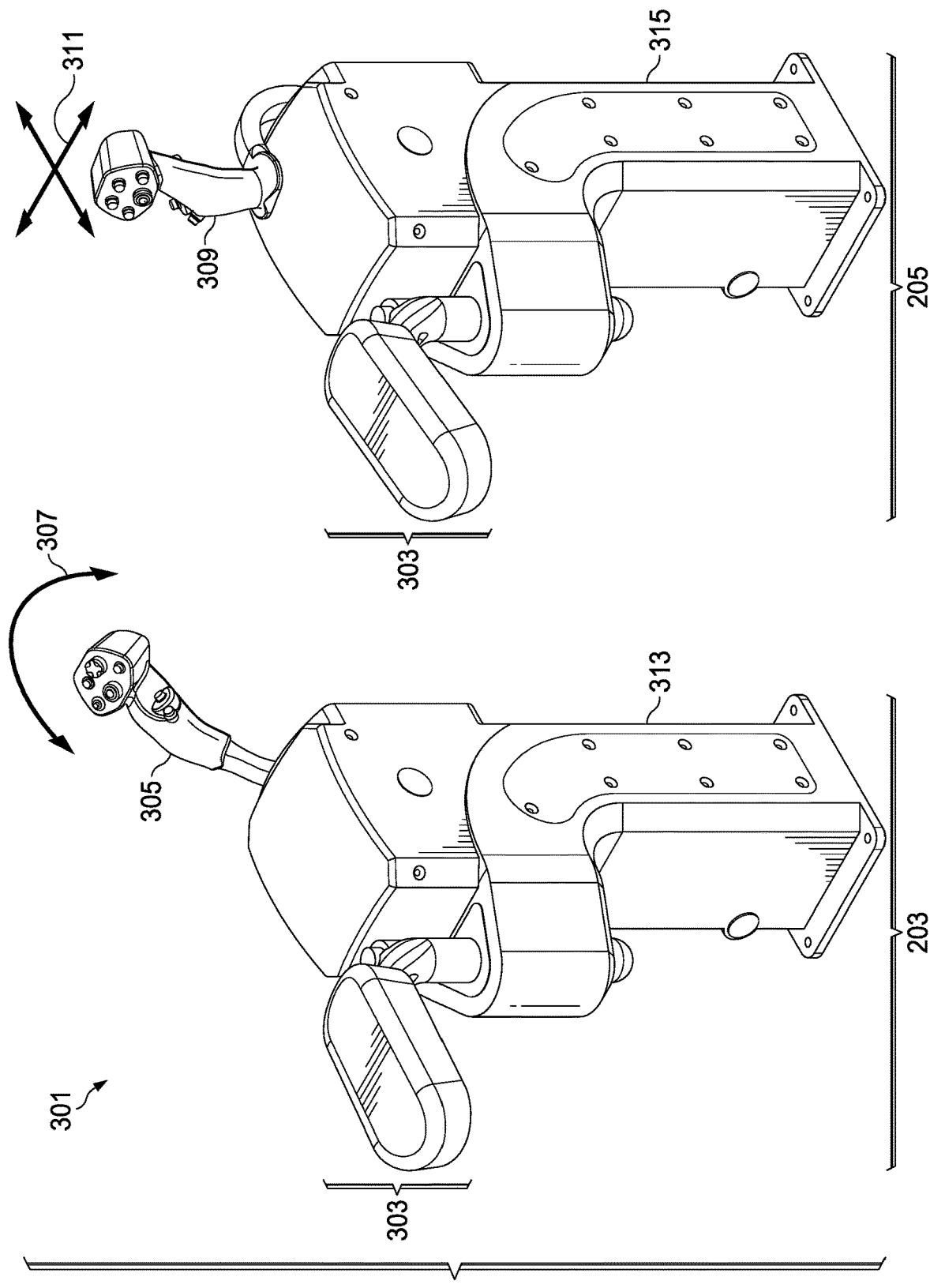
FIG. 3 is a diagram illustrating collective and cyclic control assemblies with adjustable armrests according to some embodiments.

FIG. 3 is a diagram illustrating a collective control assembly 203 and cyclic control assembly 205 with adjustable armrests 303 according to some embodiments. The collective control assembly 203 has a control stick or collective stick 305 that controls the pitch of the rotor blades to change the altitude of the rotorcraft. The collective stick 305 is mounted on a collective podium 313 that, in some embodiments, houses mechanical systems that connect the collective stick 305 to collective control sensors, feedback systems, and the like. The cyclic control assembly 205 has a control stick or cyclic stick 309 that controls the rotor blades to cause the rotorcraft to translate front to back and side to side, or to pitch or roll. The cyclic stick 309 is mounted on a cyclic podium 315 that, in some embodiments, houses mechanical systems that connect the cyclic stick 309 to cyclic control sensors, feedback systems, and the like.

The collective stick 305 has a collective range of motion 307 that is an arc. The collective stick 305 range of motion 307 simulates a lever action to provide a pilot with a natural motion pilots associate with mechanical collective controls. The range of motion 307 for the collective stick 305 is along a single axis, extending substantially forward and backward with respect to the rotorcraft body. In contrast, the cyclic stick 309 has a cyclic range of motion 311 along multiple axes. In some embodiments, the cyclic range of motion 311 is substantially along a flat plane, and in other embodiments, the cyclic range of motion 311 may be slightly curved along one or more axes to simulate a gimbal system that pilots may associated with mechanical cyclic controls. Thus, the cyclic stick 309 is moved from side to side to translate the rotorcraft sideways or control the roll of the rotorcraft, and forward and backward to translate the rotorcraft forward or backwards, or control the pitch of the rotorcraft. In some embodiments, the FBW system may interpret cyclic commands based on the speed of the rotorcraft, for example, translating the rotorcraft at speeds below a threshold, and rolling or pitching the rotorcraft at speeds above the threshold.

The collective range of motion 307 and cyclic range of motion 311 are engaged using different motions. A pilot may use the collective stick 305 by moving their arm forward and down to decrease the collective angle of the main rotor blades, or backwards and upwards to increase the angle of the main rotor blades. The armrest 303 of the collective control assembly 203 may be adjusted so that a top surface, rest surface or contact surface of the armrest 303 is angled to correspond to the collective range of motion 307. Thus, a pilot may maintain their forearm, or another part of their body, in contact with the armrest 303 as the collective stick 305 is moved back and forth.

A pilot may use the cyclic stick 309 by moving their hand through the cyclic range of motion 311. The armrest 303 of the cyclic control assembly 205 may be adjusted so that a top surface, rest surface or contact surface of the armrest 303 that is substantially parallel to, or corresponds to, the cyclic range of motion 311. Thus, a pilot may slide their forearm, or another part of their body, across the contact surface in any direction while controlling the cyclic stick 309. In this arrangement, the pilot's arm will maintain contact with the armrest 303 while moving the cyclic stick 309.

Figure 4A:
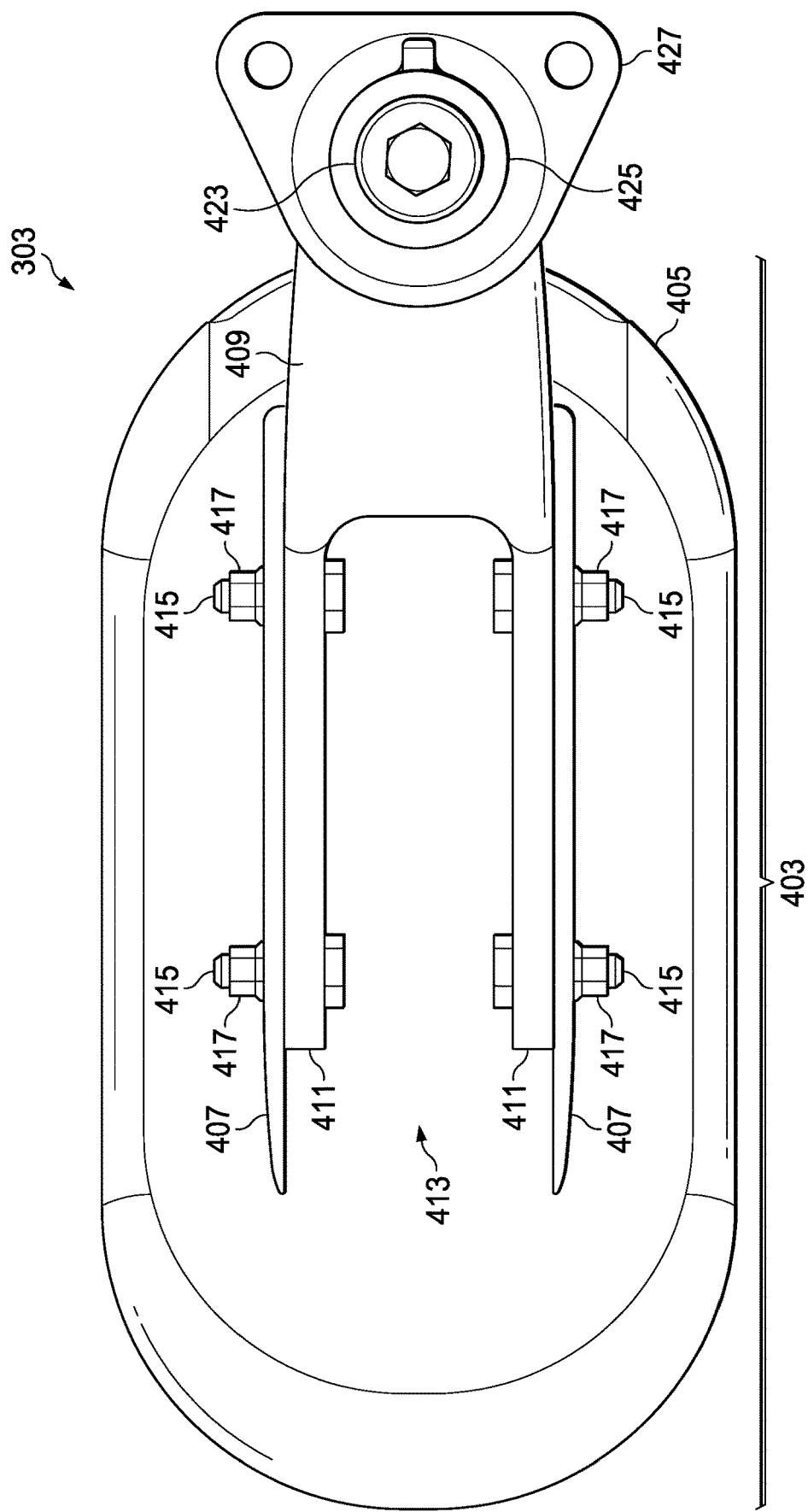
FIGS. 4A and 4B are drawings illustrating views of an adjustable armrest according to some embodiments.
Figure 4B:
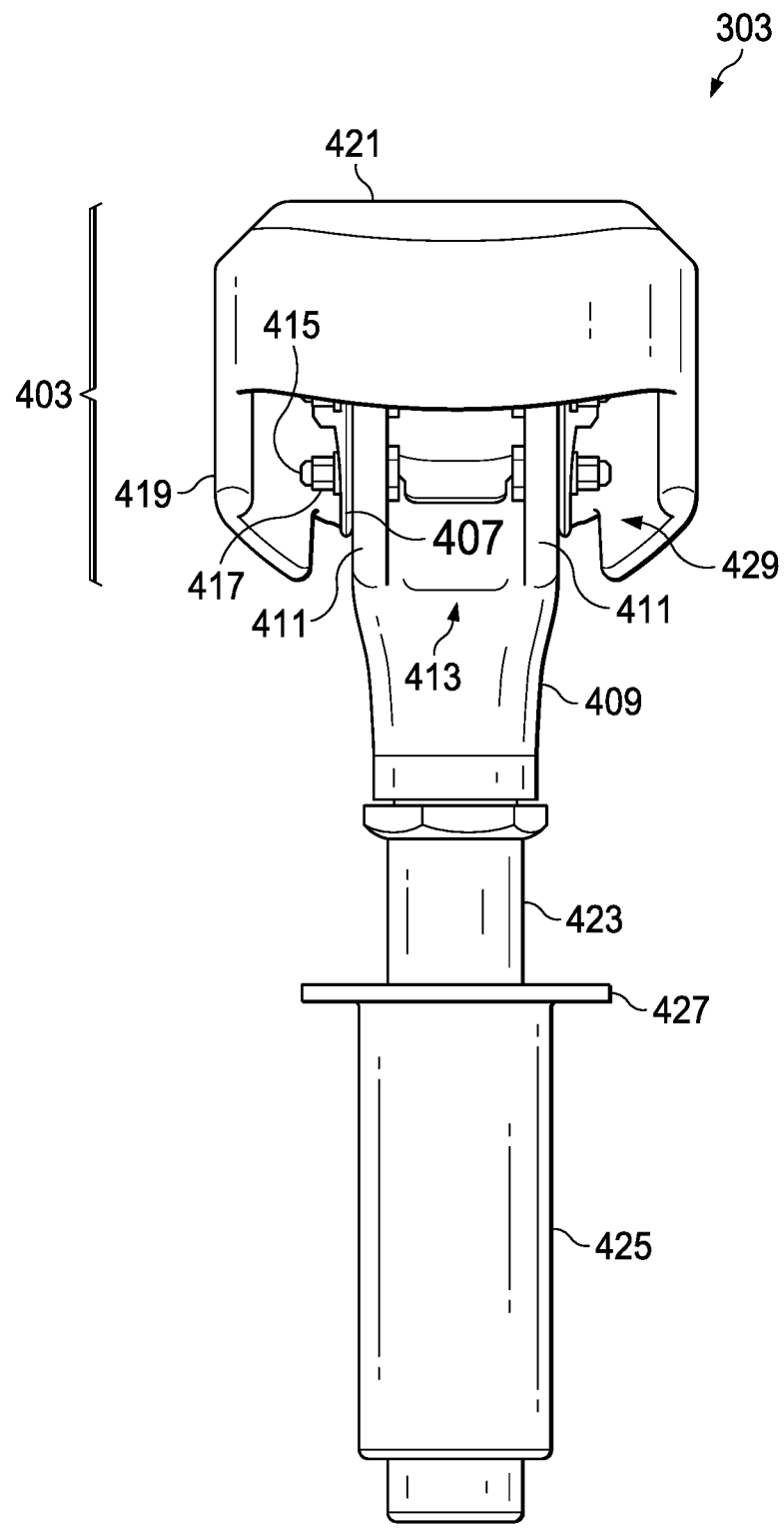

FIGS. 4A and 4B are drawings illustrating views of an adjustable armrest 303 according to some embodiments. FIG. 4A illustrates a bottom view of an armrest 303 according to some embodiments, and FIG. 4B illustrates a rear view of an armrest 303 according to some embodiments. The armrest 303 includes a platform structure 403 that is adjustably attached to an armrest support 409. The platform structure 403 includes an armrest pad 405 with a contact surface 421. The angle of the contact surface 421 is adjusted by changing the relationship between the platform structure 403 and the armrest support 409. The platform structure 403 includes one or more attachment structures 407, and in some embodiments, the attachment structures 407 are substantially rigid, and may be integrated into a frame or other structure on which the armrest pad 405 is attached and are disposed on an opposite side of the platform structure 403 from the contact surface 421. In some embodiments, the attachment structures 407 are part of a larger frame on which the armrest pad is formed or otherwise attached. The attachment structures 407 may be at least partly disposed in a cavity 429 on the bottom side of the platform structure 403. The cavity 429 may be bounded by sidewalls 419 of the platform structure, leaving the cavity 429 open at the bottom of the platform structure 403 for attachment of the platform structure 403 to the armrest support 409.

The armrest support 409 has, in some embodiments, a post 423 or other structure that may be fitted into a mounting sleeve 425 or other mounting point. In some embodiments, the mounting sleeve 425 is configured to be attached to a control podium by fasteners securing a flange 427 of the mounting select to a fixed surface of the control podium. The armrest support 409 further has attachment elements for attachment of the platform structure 403. In some embodiments, the armrest support 409 has two fingers 411 separated by a gap 413 to reduce weight of the armrest support 409, with the two fingers 411 extending substantially laterally from the post 423. In other embodiments, the armrest support 409 may have a single attachment element, and may, for example, be substantially flat, round, or another shape for attachment of the platform structure 403.

The armrest support 409 may be formed of a substantially rigid material that is a metal such as steel, titanium, aluminum, an alloy or the like, a composite such as fiberglass, carbon fiber, or the like, a polymer such as nylon or the like, or another rigid material. In some embodiments, the armrest support 409 is steel, and is formed by investment casting, sand casting, machining, or another process.

In some embodiments, the platform structure 403 is attached to the armrest support 409 by fasteners 415 that extend through attachment holes in the attachment structure 407 and one or more holes in the fingers 411, with the fasteners 415 being secured by retainers 417. In some embodiments, one or both of the attachment structures 407 and the fingers 411 may have multiple sets of holes that allow the platform structure 403 to be adjusted in relation to the armrest support 409. In some embodiments, the fasteners 415 are bolts, and the retainers 417 are nuts, or the like. The fasteners 415 may extend from the inside gap 429, through attachment holes in the attachment structures 407 and through corresponding pivot holes or adjustment holes in the fingers 411. In other embodiments, the fasteners 415 may be clips, detent balls or plates, screws friction devices, clamps, or the like, and the retainers 417 may be omitted. Thus, one end of the contact surface 421 may be raised or lowered to adjust the angle of the contact surface 421. In other embodiments, the platform structure 403 is attached to the armrest support 409 by an adjustable system or mechanism such as a ratcheting mechanism, by adjustable clips, by a friction mechanism, or another adjustable mechanism. Additionally, the sidewalls 419 of the platform structure may extend at least partially over the fasteners and retainers 417 to prevent pilot contact with sharp of hard surfaces of the fasteners 415 or retainers 417, and to visually enhance the armrest 303.

Figure 5A:
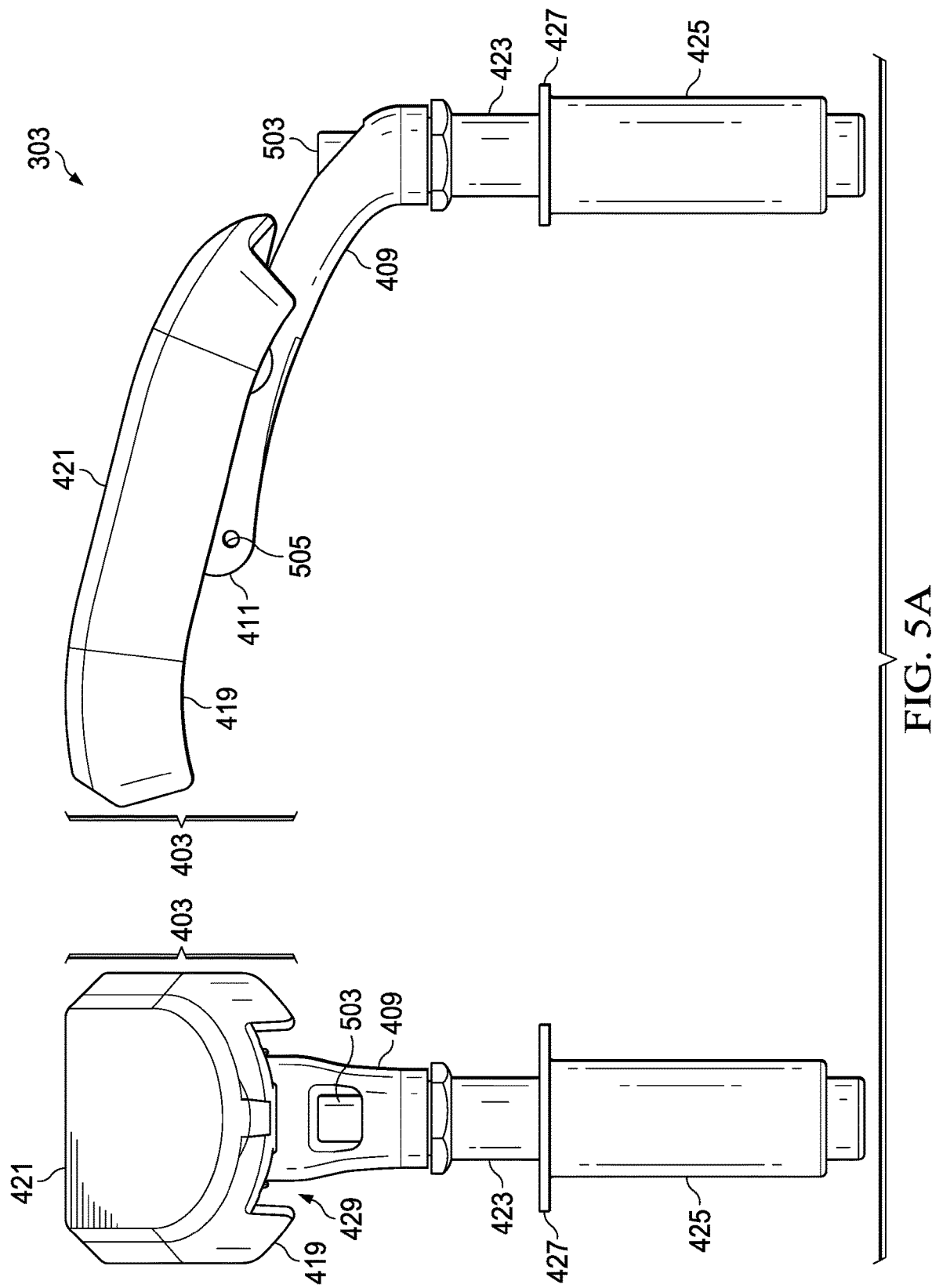
FIGS. 5A and 5B are drawings illustrating views of an adjustable armrest in various positions according to some embodiments.
Figure 5B:
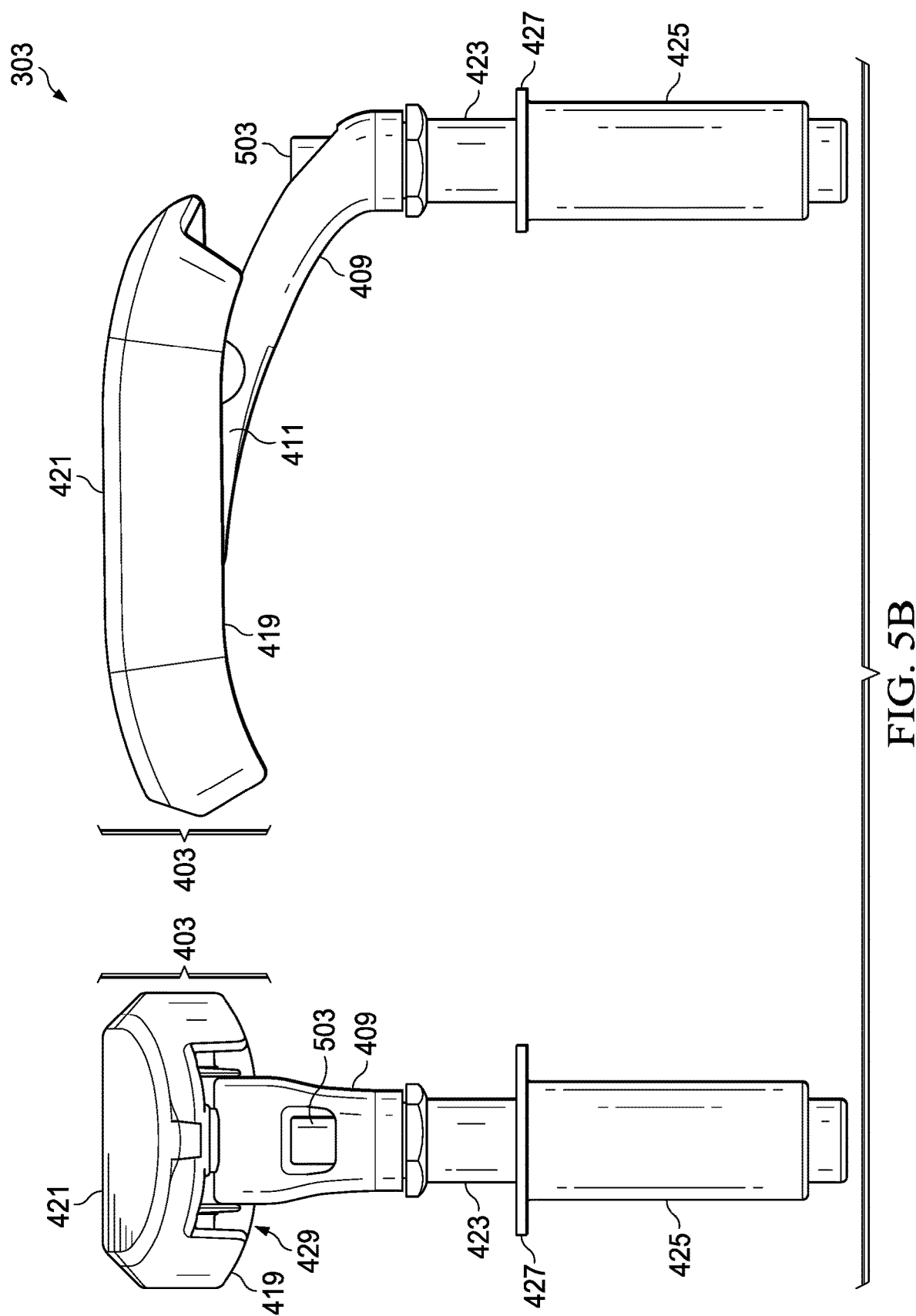

FIGS. 5A and 5B are drawings illustrating views of an adjustable armrest 303 in various positions according to some embodiments. FIG. 5A illustrates front and side views of an armrest 303 in a first, or raised, position according to some embodiments. The platform structure 403 is attached to the fingers 411 of the armrest support 409 so that the contact surface 421 of the platform structure 403 is at a first angle to the post 423. In some embodiments, the angle of the platform structure 403 and of the contact surface 421 of the platform structure 403 is determined by which of one or more adjustment holes 505 on the finger 411 of the armrest support 409 the platform structure 403 is attached to. For example, the platform structure 403 may be attached to an upper adjustment hole (not shown) to secure the platform structure 403 at the first angle or at a raised position. However, the fingers 411 may have additional adjustment holes 505 permitting the platform structure 403 to be secured at other angles.

Additionally, an actuator 503 such as a plunger, lever, button or the like may be provided to activate or engage a height adjustment mechanism (not shown) disposed in the post 423, and which may interact with the mounting sleeve 425 to permit the armrest support 409 to be raised or lowered with respect to the mounting sleeve 425, and consequently, with respect to the pedestal or other surface on which the armrest 303 is installed. Thus, the armrest 303 has an adjustable angle and height, permitting an armrest to be installed for use with cyclic or collective controls.

FIG. 5B illustrates front and side views of an armrest 303 in a second, or lowered, position according to some embodiments. Here, the contact surface 421 of the platform structure 403 is lowered so that the contact surface 421 is substantially perpendicular to the post 423. Thus, in some embodiments, the second angle, or lowered position, is closer to being perpendicular to the post 423 than the first angle or raised position. In some embodiments, the contact surface 421 of the platform structure 403, when in the lowered position, will have an angle with respect to the post 423 that is less than the angle of the contact surface 421 when the platform structure 403 is in the raised position. Thus, the contact surface 421 may be adjusted to have one of a plurality of angles, with different angles corresponding to the range of motion for a cyclic or collective control stick. Additionally, in some embodiments, the platform structure 403 may be attached to the fingers 411 at a lower adjustment hole (see element 505, FIG. 5A) to secure the platform structure 403 at the second angle or at the lowered position.

Figure 6A:
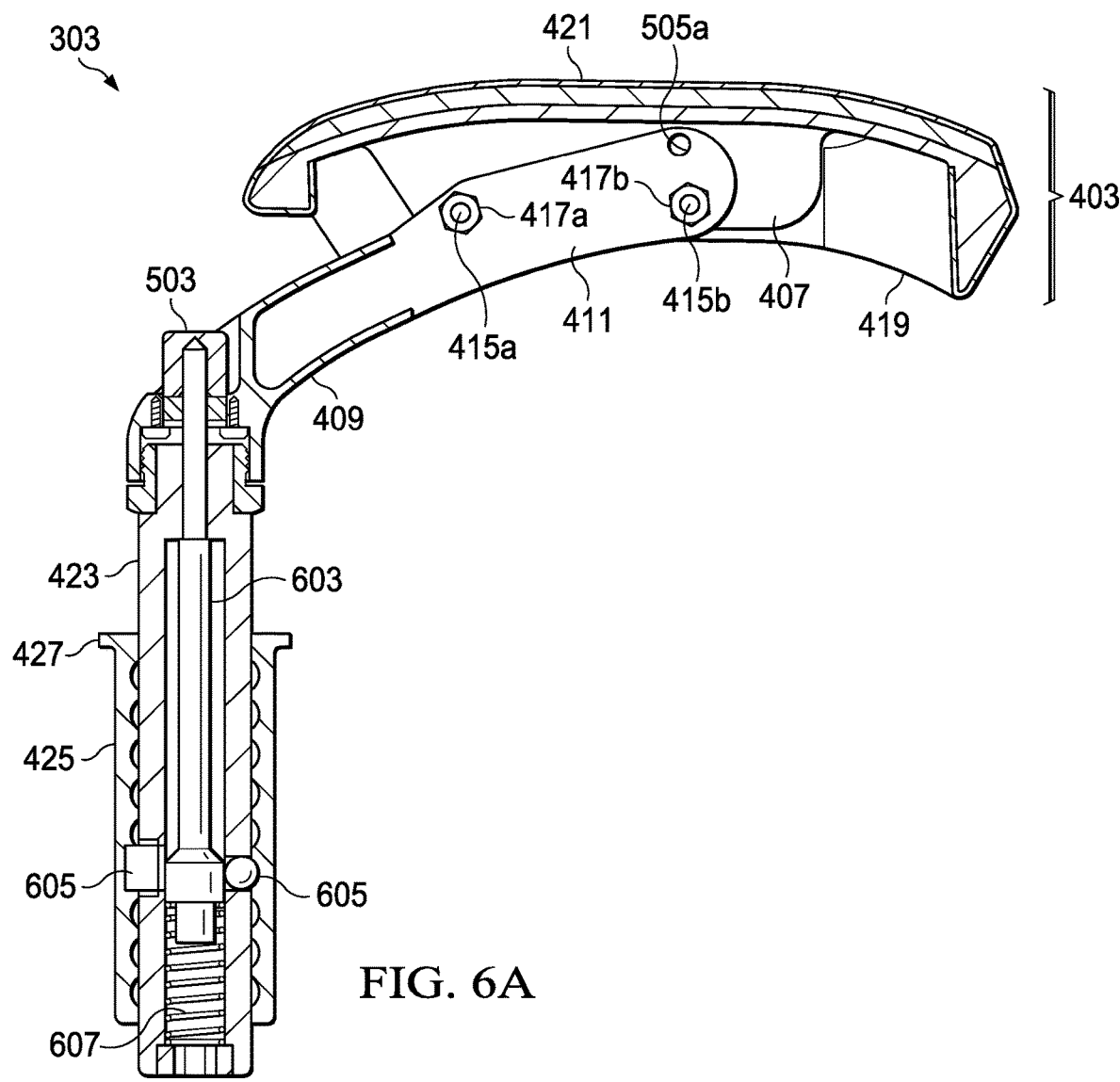
FIGS. 6A and 6B are drawings illustrating cutaway views of an adjustable armrest in various positions according to some embodiments.
Figure 6B:
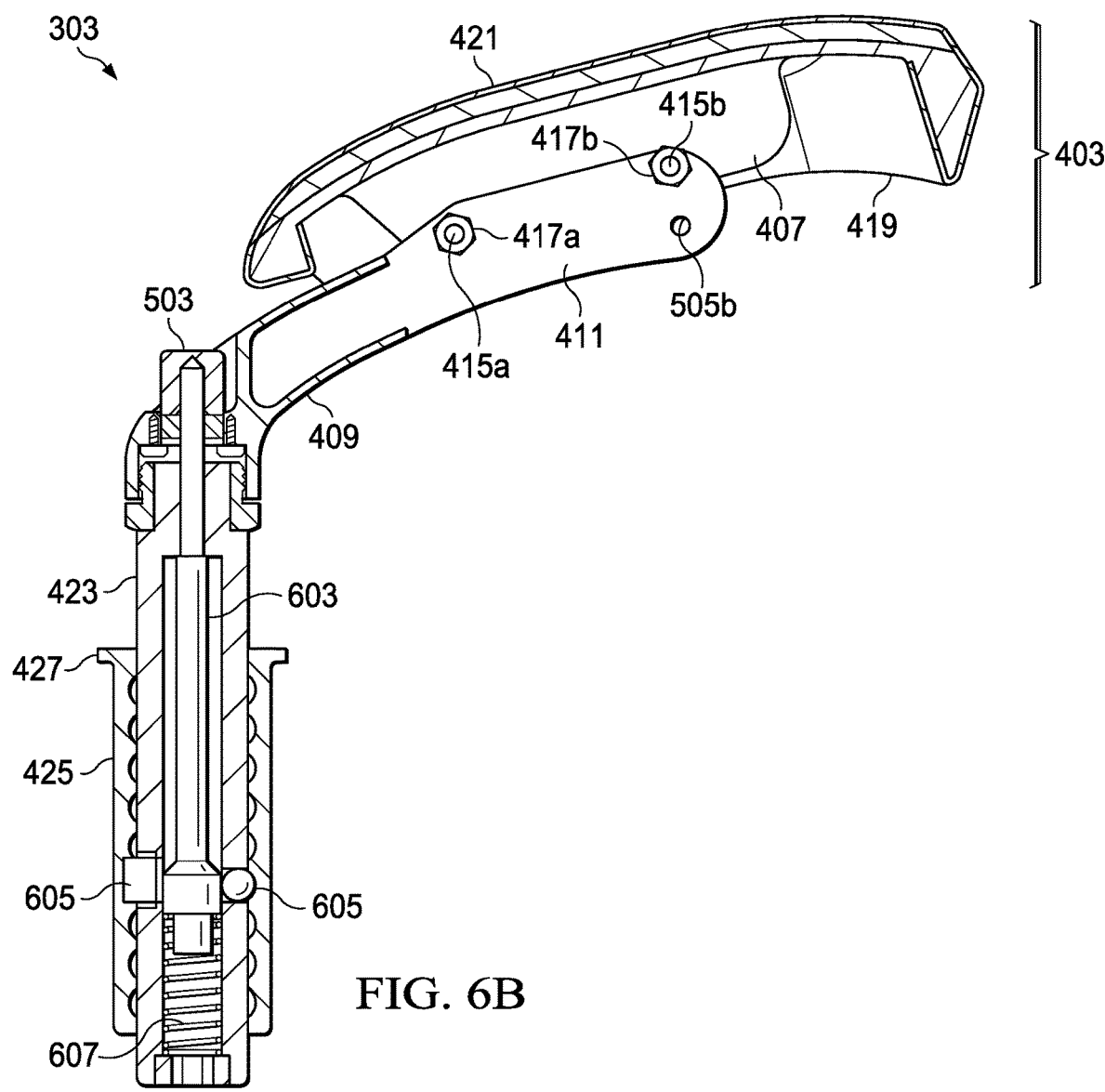

FIGS. 6A and 6B are drawings illustrating cutaway views of an adjustable armrest 303 in various positions according to some embodiments. FIG. 6A illustrates the adjustable armrest 303 with the platform structure 403 in the lowered position. FIG. 6B illustrates the adjustable armrest 303 with the platform structure 403 in the raised position.

In some embodiments, the armrest support 409 has two or more adjustment holes 505a and 505b which may be disposed in fingers 411 of the armrest support 409. An adjustment fastener 415b may be disposed in one of the adjustment holes 505a and 505b and a hole in the attachment structure 407, and may be retained by an adjustment end retainer 417b. Additionally, a pivot fastener 415a may be disposed in a pivot hole (not shown) in a finger 411 of the armrest support 409 and in a hole on the attachment structure 407. In an embodiment, the adjustment holes 505a and 505b each have a same spacing from the pivot hole, permitting an end of the platform structure 403 to be raised or lowered by aligning the upper adjustment hole 505a or the lower adjustment hole 505b with a hole in the attachment structure 407.

An embodiment height adjustment mechanism is also shown disposed within the post 423. In some embodiments, the height adjustment mechanism is engaged by an actuator 503. A user presses the actuator 503, which causes a plunger shaft 603 to move downwards, releasing pressure from one or more catch elements 605, which disengage from catch element retainers, such as ridges or the like, that are disposed on an inner wall of the mounting sleeve 425. The height of the armrest support 409 may then be adjusted. When the user releases the actuator 503, a return element 607, such as a spring, or the like, moves the plunger shaft 603 upwards, or opposite the direction the user presses the actuator 503, to reengage the catch elements with the catch element retainers of the mounting sleeve 425. Such an arrangement permits the armrest support 409 and post 423 to pivot within the mounting sleeve 425 while maintaining the selected height and permitting the platform structure 403 to be freely adjusted.

An embodiment vehicle control structure includes a control podium, a control stick mounted on the control podium and having a range of motion, a mounting sleeve affixed to the control podium, and an armrest having a platform structure and an armrest support, wherein a first portion of the armrest support is disposed in the mounting sleeve. The platform structure is adjustably attached to the armrest support a first angle of a plurality of angles relative to the armrest support, and a first angle of the plurality of angles corresponds to the range of motion.

In some embodiments, the armrest support further has a height adjustment mechanism disposed in the first portion. In some embodiments, the armrest support has a plurality of fingers extending substantially laterally away from the first portion of the armrest support, and the platform structure is adjustably attached to the plurality of fingers. In some embodiments, each of the plurality of fingers has a pivot hole and a plurality of adjustment holes. In some embodiments, each adjustment hole of the plurality of adjustment holes in each finger of the plurality of fingers corresponds to an angle of the plurality of angles, a first adjustment hole of the plurality of adjustment holes corresponds to the first angle, and the platform structure is attached to the armrest support at the pivot hole and the first adjustment hole of each finger of the plurality of fingers. In some embodiments, a second angle corresponds to a second adjustment hole in each finger of the plurality of fingers, and wherein the first angle is different from the second angle. In some embodiments, the armrest further has a first removable fastener disposed in the pivot hole and a plurality of second removable fasteners each extending through the first adjustment hole of each of the plurality of fingers. In some embodiments, the platform structure has a contact surface and a plurality of attachment structures disposed on an opposite side of the platform structure from the contact surface, each of the plurality of attachment structures has a first attachment hole corresponding to the pivot hole of a respective finger of the plurality of fingers, and each of the one or more attachment structures has a second attachment hole corresponding to each adjustment hole of the plurality of adjustment holes of the respective finger. In some embodiments, the control stick is one of a cyclic control stick and a collective control stick.

An embodiment armrest includes an armrest support having one or more fingers, with each of the one or more fingers has a pivot hole and a plurality of adjustment holes, a platform structure having a contact surface and one or more attachment structures disposed on an opposite side of the platform structure from the contact surface, where each of the one or more attachment structures has a first attachment hole, and one or more fasteners disposed in the first attachment hole of a first attachment structure of the one or more attachment structures and extending through a first adjustment hole of the plurality of adjustment holes in a first finger of the one or more fingers with the contact surface held in a raised position. A second adjustment hole of the plurality of adjustment holes in the first finger is disposed below the first adjustment hole.

In some embodiments, the armrest support further has a post, and the one or more fingers extend substantially laterally away from the post. In some embodiments, the post has a height adjustment mechanism disposed in the post. In some embodiments, the one or more fingers comprises two fingers spaced apart by a gap, and wherein a portion of each of the one or more fasteners extends from inside the gap through a respective one of the one or more fingers.

An embodiment rotorcraft includes a first control podium having a first control stick with a first range of motion, a second control podium having a second control stick with a second range of motion that is different from the first range of motion, and a plurality of armrests, each of the plurality of armrests having an armrest support with a post and a platform structure with a contact surface. A first armrest of the plurality of armrests is installed in the first control podium and a first platform structure of the first armrest is attached to a first armrest support of the first armrest with a first contact surface of the first armrest corresponding to the first range of motion. A second armrest of the plurality of armrests is installed in the second control podium and a second platform structure of the second armrest is attached to a second armrest support of the second armrest with a second contact surface of the second armrest corresponding to the second range of motion. In some embodiments, the first control stick is a cyclic control stick, and the second control stick is a collective control stick. In some embodiments, the first armrest support and second armrest support each have a height adjustment mechanism disposed in the respective post. In some embodiments, the first contact surface has a first angle with respect to the post of the first armrest, where the first angle corresponds to the first range of motion, and the second contact surface has a second angle with respect to the post of the second armrest, where the second angle corresponds to the second range of motion. In some embodiments, the armrest support of each of the plurality of armrests has a plurality of fingers extending substantially laterally away from the post of the respective armrest of the plurality of armrests, wherein the platform structure of the respective armrest is adjustably attached to the plurality of fingers of the respective armrest. In some embodiments, of the plurality of fingers has a pivot hole and a plurality of adjustment holes, a first adjustment hole of the plurality of adjustment holes corresponds to the first angle and a second adjustment hole of the plurality of adjustment holes corresponds to the second angle, the first armrest has first removable fasteners disposed in the pivot hole of the first armrest and extending through a first attachment hole in the first platform structure, and the first armrest has a plurality of second removable fasteners each extending through the first adjustment hole of a respective finger of the plurality of fingers and through a respective second attachment hole in the first platform structure, the first fastener and the second fasteners attaching the first platform structure the first armrest support. In some embodiments, the first platform structure has a first pad with the first contact surface and a first attachment structure disposed on an opposite side of the first platform structure from the first contact surface, the first platform structure is attached to the first armrest support by a first plurality of removable fasteners connecting the first attachment structure to the plurality of fingers of the first armrest support, and the second platform structure has a second pad with the second contact surface and a second attachment structure disposed on an opposite side of the second platform structure from the second contact surface, wherein the second platform structure is attached to the second armrest support by a second plurality of removable fasteners connecting the second attachment structure to the plurality of fingers of the second armrest support.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A vehicle control structure, comprising:
a control podium;
a control stick mounted on the control podium and having a range of motion;
a mounting sleeve affixed to the control podium; and
an armrest having a platform structure and an armrest support, wherein the platform structure has a contact surface and two attachment structures that are disposed on an opposite side of the platform structure from the contact surface, wherein the armrest support has a post portion that is disposed in the mounting sleeve and that has a first post end extending above the mounting sleeve, wherein the armrest support has two fingers, wherein each finger of the two fingers has a first finger end attached to the first post end, wherein the two fingers extend laterally from the first post end, wherein the two fingers are separated from each other by a gap and are disposed between opposing lateral edges of the platform structure and between the two attachment structures;
wherein the platform structure is adjustably attached to the armrest support at a first angle of a plurality of angles relative to the armrest support by an adjustment mechanism that adjustably connects each of the two fingers to respective ones of the two attachment structures, and wherein the first angle of the plurality of angles corresponds to the range of motion.

2. The vehicle control structure of claim 1, wherein the armrest support further has a height adjustment mechanism disposed in the post portion, wherein the height adjustment mechanism has an actuator that extends through the first post end and that causes, in response to a user pressing the actuator, catch elements to disengage from a catch element retainer disposed on an inner wall of the mounting sleeve to allow the user to change a height of the armrest support.

3. The vehicle control structure of claim 1, wherein the adjustment mechanism comprises a pivot hole and a plurality of adjustment holes disposed in each of the two fingers.

4. The vehicle control structure of claim 3, wherein each adjustment hole of the plurality of adjustment holes in each finger of the two fingers corresponds to an angle of the plurality of angles, wherein a first adjustment hole of the plurality of adjustment holes corresponds to the first angle, and wherein the platform structure is attached to the armrest support at the pivot hole and an adjustment hole of the plurality of adjustment holes of each finger of the two fingers.

5. The vehicle control structure of claim 4, wherein a second angle corresponds to a second adjustment hole in each finger of the two fingers, and wherein the first angle is different from the second angle.

6. The vehicle control structure of claim 5, wherein the adjustment mechanism further comprises a first removable fastener disposed in the pivot hole and a plurality of second removable fasteners each extending through the first adjustment hole of each of the two fingers.

7. The vehicle control structure of claim 6, wherein each of the two attachment structures has a first attachment hole corresponding to the pivot hole of a respective finger of the two fingers, and wherein each of the two attachment structures has a second attachment hole corresponding to each adjustment hole of the plurality of adjustment holes of the respective finger.

8. The vehicle control structure of claim 1, wherein the control stick is one of a cyclic control stick and a collective control stick.

9. The vehicle control structure of claim 1, wherein the platform structure comprises a frame and an armrest pad that forms the contact surface and that is attached to the frame, and wherein each of the two attachment structures is substantially rigid and is integrated into the frame.

10. The vehicle control structure of claim 9, wherein each of the two attachment structures is at least partly disposed in a cavity on a bottom side of the platform structure, wherein the cavity is bounded by sidewalls of the platform structure and is open at the bottom side of the platform structure.

11. An apparatus, comprising:
a control podium having a control stick with a range of motion and further having a mounting sleeve; and
an armrest having an armrest support with a post and a platform structure with a contact surface, wherein a portion of the post is disposed in the mounting sleeve with a post end extending above the mounting sleeve, wherein the platform structure is attached to the post end of the armrest support that extends above the mounting sleeve, wherein the platform structure has a contact surface of the armrest corresponding to the range of motion, wherein the platform structure has two attachment structures that are disposed on an opposite side of the platform structure from the contact surface, wherein the armrest support has a post portion that is disposed in the mounting sleeve and that has a first post end extending above the mounting sleeve, wherein the armrest support has two fingers, wherein each finger of the two fingers has a first finger end attached to the first post end, wherein the two fingers extend laterally from the first post end, wherein the two fingers are separated from each other and are disposed between opposing lateral edges of the platform structure and between the two attachment structures, and wherein each of the two attachment structures is at least partly disposed in a cavity on a bottom side of the platform structure, wherein the cavity is bounded by sidewalls of the platform structure, wherein each of the two fingers is adjustably attached to respective ones of the two attachment structures.

12. The apparatus of claim 11, wherein each of the two fingers has a pivot hole and a plurality of adjustment holes, wherein a first adjustment hole of the plurality of adjustment holes corresponds to a first angle between the contact surface and the armrest support, and wherein a second adjustment hole of the plurality of adjustment holes corresponds to a second angle between the contact surface and the armrest support;

wherein the armrest has first fasteners that are each disposed in the pivot hole of a respective finger of the two fingers and that each attach the respective finger to an attachment structure of the two attachment structures; and wherein the armrest has second fasteners that are each disposed in an adjustment hole of the plurality of adjustment holes of a respective finger of the two fingers and that each attach the respective finger to an attachment structure of the two attachment structures.

13. The apparatus of claim 11, wherein the post portion has a height adjustment mechanism disposed therein, and wherein the height adjustment mechanism has an actuator that extends through the first post end and that causes, in response to a user pressing the actuator, catch elements to disengage from a catch element retainer disposed on an inner wall of the mounting sleeve to allow the user to change a height of the armrest support.

14. The apparatus of claim 11, wherein the platform structure comprises a frame and an armrest pad that forms the contact surface and that is attached to the frame, and wherein each of the two attachment structures is substantially rigid and is integrated into the frame.

* * * * *